US012610138B2

(12) United States Patent
Lelescu et al.

(10) Patent No.: US 12,610,138 B2
(45) Date of Patent: Apr. 21, 2026

(54) EXTENDED DEPTH OF FIELD USING DEEP LEARNING

(71) Applicant: Apple Inc., Cupertino, CA (US)

(72) Inventors: Dan C. Lelescu, Grandvaux (CH); Rohit Rajiv Ranade, Pleasanton, CA (US); Noah Bedard, Los Gatos, CA (US); Brian McCall, San Jose, CA (US); Kathrin Berkner Cieslicki, Los Altos, CA (US); Michael W. Tao, San Jose, CA (US); Robert K. Molholm, Scotts Valley, CA (US); Toke Jansen, Holte (DK); Vladimir Krneta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 18/347,604

(22) Filed: Jul. 6, 2023

(65) Prior Publication Data

US 2024/0107162 A1      Mar. 28, 2024

Related U.S. Application Data

(60) Provisional application No. 63/408,869, filed on Sep. 22, 2022.

(51) Int. Cl.
| | |
|---|---|
| *H04N 23/67* | (2023.01) |
| *G06T 7/30* | (2017.01) |
| *H04N 23/958* | (2023.01) |

(52) U.S. Cl.
CPC .............. *H04N 23/67* (2023.01); *G06T 7/30* (2017.01); *H04N 23/958* (2023.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 11,863,881 | B2 * | 1/2024 | Feng | ........................ G06T 5/94 |
| 12,198,300 | B2 * | 1/2025 | Yang | .................... G02B 21/367 |
| 2011/0182528 | A1 | 7/2011 | Scherteler et al. | |
| 2019/0333199 | A1 * | 10/2019 | Ozcan | .................... G06N 3/047 |
| 2021/0149170 | A1 * | 5/2021 | Leshem | .............. G02B 21/006 |

OTHER PUBLICATIONS

Bhat et al., "Deep Burst Super-Resolution," CVPR 2021 paper, Open Access Version, Computer Vision Foundation, pp. 9209-9218, year 2021.

(Continued)

*Primary Examiner* — Quan Pham
(74) *Attorney, Agent, or Firm* — Meitar Patents LTD.; Daniel Kligler

(57) ABSTRACT
A method for image enhancement includes capturing multiple input images of a scene, including at least a first input image having a first field of view (FOV) captured with a first focal depth and a second input image having a second FOV captured with a second focal depth. The input images in the sequence are preprocessed so as to align the images. The aligned images are processed in a neural network, which generates an output image having an extended depth of field encompassing at least the first and second focal depths.

22 Claims, 5 Drawing Sheets

(56)        References Cited

OTHER PUBLICATIONS

Godard et al., "Deep Burst Denoising," arXiv:1712.05790v1, pp. 1-10, Dec. 15, 2017.
Haris et al., "Deep Back-Projection Networks for Single Image Super-Resolution," arXiv:1904.05677v2, pp. 1-14, Jun. 13, 2020.
Lim et al., "Enhanced Deep Residual Networks for Single Image Super-Resolution," arXiv:1707.02921v1, pp. 1-9, Jul. 10, 2017.
Ronneberger et al., "U-Net: Convolutional Networks for Biomedical Image Segmentation," arXiv:1505.04597v1, pp. 1-8, May 18, 2015.
Wronski et al., "Handheld Multi-Frame Super-Resolution," arXiv:1905.03277v2, pp. 1-24, Feb. 16, 2021.
Nguyen et al., U.S. Appl. No. 18/184,677, filed Mar. 16, 2023.
Pourreza-Shahri , "Automatic Exposure Selection for High Dynamic Range Photography," IEEE International Conference on Consumer Electronics (ICCE), 2015, pp. 1-2.
Jia et al "Dynamic Filter Networks,", 30th Conference on Neural Information Processing Systems (NIPS 2016), Barcelona, Spain), pp. 1-9.
Final Office Action, U.S. Appl. No. 18/184,677, dated Nov. 26, 2025.

* cited by examiner

EXTENDED DEPTH OF FIELD USING DEEP LEARNING

CROSS-REFERENCE TO RELATED APPLICATION

This application claims the benefit of U.S. Provisional Patent Application 63/408,869, filed Sep. 22, 2022, which is incorporated herein by reference.

FIELD OF THE INVENTION

The present invention relates generally to methods and devices for electronic imaging, and particularly to improving the quality of electronic images.

BACKGROUND

"Depth of field" in an optical image is the distance between the nearest and most distant objects that appear in the image with acceptably sharp focus. A sharper focus can be achieved using a camera with a high numerical aperture (NA), or equivalently a low F-number. Images captured with high NA, however, are typically characterized by shallow depth of field. Because of these limitations, methods have been developed for computerized processing of electronic images to extend the apparent depth of field of the images.

SUMMARY

Embodiments of the present invention that are described hereinbelow provide methods, apparatus, and computer software products for enhancing the quality of electronic images.

There is therefore provided, in accordance with an embodiment of the invention, a method for image enhancement, which includes capturing multiple input images of a scene, including at least a first input image having a first field of view (FOV) captured with a first focal depth and a second input image having a second FOV captured with a second focal depth. The input images in the sequence are preprocessed so as to align the images. the aligned images are processed in a neural network, which generates an output image having an extended depth of field encompassing at least the first and second focal depths.

In one embodiment, capturing the multiple images includes capturing at least the first and second input images sequentially using a handheld imaging device.

Alternatively, capturing the multiple images includes capturing at least the first input image using a first camera and at least the second input image using a second camera, different from the first camera. In some embodiments, the second FOV is wider than the first FOV, for example at least 15% wider than the first FOV. In a disclosed embodiment, capturing at least the second input image includes capturing multiple second input images having different, respective focal depths using the second camera.

Additionally or alternatively, the second FOV is shifted transversely relative to the first FOV, for example by at least 1° relative to the first FOV.

In a disclosed embodiment, the second focal depth is greater than the first focal depth, for example at least 30% greater than the first focal depth.

In some embodiments, the first image has a first depth of field, and the second image has a second depth of field, different from the first depth of field. In one embodiment, the first focal depth is equal to the second focal depth.

Additionally or alternatively, the sequence of images includes no more than three input images, which are processed to generate the output image. In one embodiment, the second focal depth is greater than the first focal depth, and the sequence of images includes a third input image having a third focal depth greater than the second focal depth, wherein the extended depth of field encompasses at least the first and third focal depths.

In some embodiments, preprocessing the input images includes aligning the fields of view of the input images. Additionally or alternatively, preprocessing the input images includes warping one or more of the input images so as to register geometrical features among the input images. Further additionally or alternatively, preprocessing the images includes correcting photometric variations among the input images.

In a disclosed embodiment, the method includes training the neural network using a ground-truth image of a test scene having an extended depth of field and a set of training images of the test scene having different, respective focal settings.

In some embodiments, processing the aligned images includes generating the output image such that an object in the scene that is out of focus in each of the input images is sharply focused in the output image.

In a disclosed embodiment, the neural network includes one or more encoder layers, which encode features of the images, and decoding layers, which process the encoded features to generate the output image, and processing the aligned images includes implementing the encoder layers in a first processor to produce encoded features of the input images, and conveying the encoded features to a second processor, which implements the decoding layers to decode the encoded features and generate the output image with the extended depth of field.

In another embodiment, preprocessing the input images further includes estimating a displacement vector and a prediction error, which predict the second image in terms of the first image, and processing the aligned images includes reconstructing the second image based on the first image and the estimated displacement vector and prediction error, and processing the first image together with the reconstructed second image to generate the output image with the extended depth of field.

There is also provided, in accordance with an embodiment of the invention, imaging apparatus, including an imaging device configured to capture multiple input images of a scene, including at least a first input image having a first field of view (FOV) captured with a first focal depth and a second input image having a second FOV captured with a second focal depth. A processor is configured to preprocess the input images in the sequence so as to align the images, and to process the aligned images in a neural network, which generates an output image having an extended depth of field encompassing at least the first and second focal depths.

In a disclosed embodiment, the imaging device includes a handheld camera, which is configured to capture at least the first and second input images sequentially.

In another embodiment, the imaging device includes a first camera, which is configured to capture at least the first input image, and a second camera, which is configured to capture at least the second input image.

There is additionally provided, in accordance with an embodiment of the invention, a computer software product, including a computer-readable medium in which program instructions are stored, which instructions, when read by a processor, cause the processor to receive multiple input images of a scene, including at least a first input image having a first field of view (FOV) captured with a first focal depth and a second input image having a second FOV captured with a second focal depth, to preprocess the input images in the sequence so as to align the images, and to process the aligned images in a neural network, which generates an output image having an extended depth of field encompassing at least the first and second focal settings.

The present invention will be more fully understood from the following detailed description of the embodiments thereof, taken together with the drawings in which:

DETAILED DESCRIPTION OF EMBODIMENTS

Figure 1:
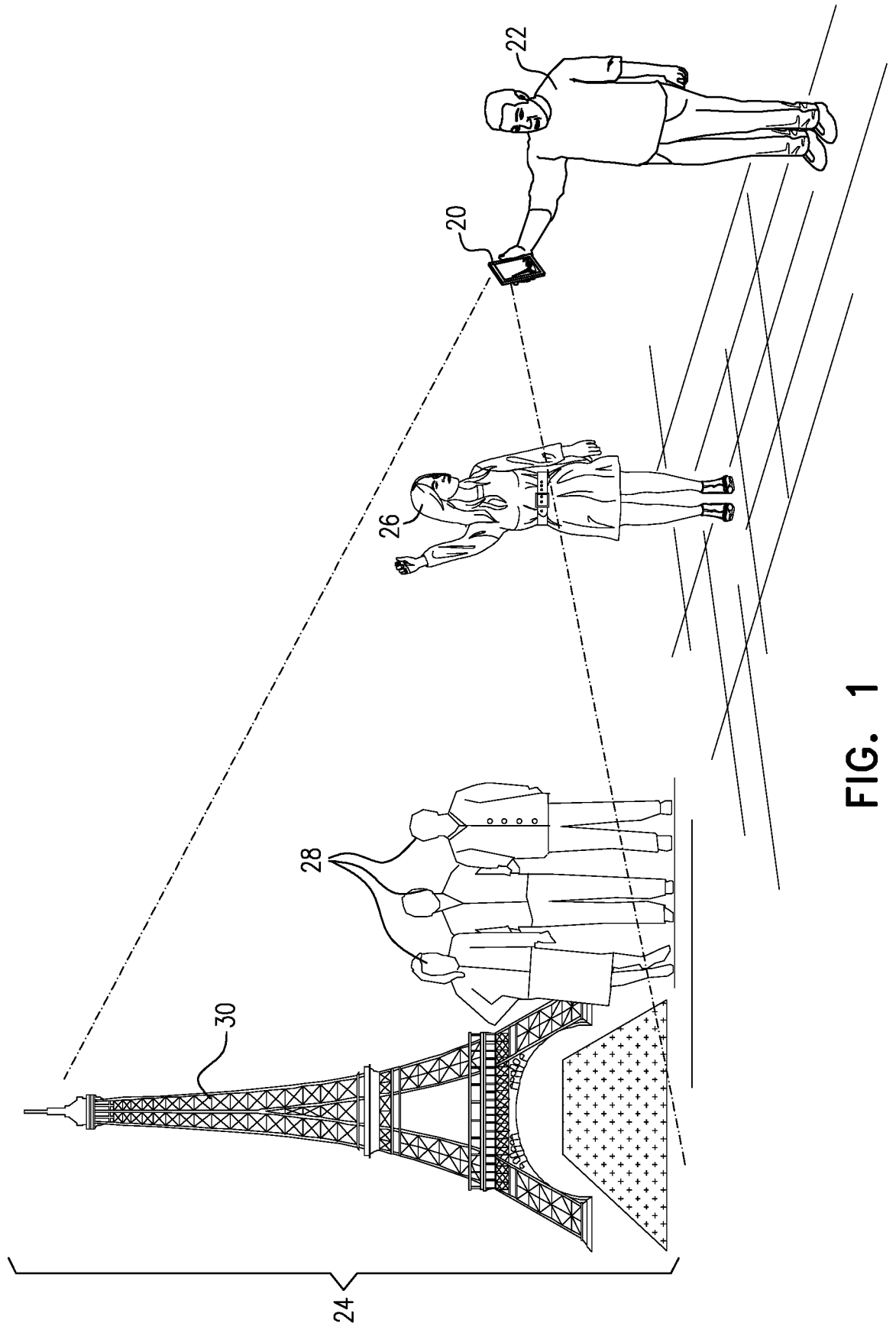
FIG. 1 is a schematic pictorial illustration showing capture of an electronic image with extended depth of field using a handheld imaging device, in accordance with an embodiment of the invention.

The vast majority of photos today are taken using handheld imaging devices, particularly smartphones. Manufacturers have made tremendous strides in enhancing the quality of images captured by smartphone cameras, for example with high-NA optics, intelligent autofocus functions, and post-acquisition image enhancement.

Depth of field, however, remains a problem, since in a high-NA image, objects at focal depths significantly different from the autofocus setting will appear blurry. For expert photographers, high-end cameras and image editing tools offer features such as focus bracketing and focus stacking, which use multiple, precisely aligned images with different focal settings to enhance depth of field. These techniques may give unsatisfactory results when implemented in a smartphone, however, due to factors such as the short time available to capture images of a particular scene, variations of the field of view (FOV) resulting from motion of the user's hand, and other uncontrolled image parameters.

Embodiments of the present invention that are described herein address these problems using a neural network, which is trained to create an output image with extended depth of field from a sparse set of input images with different focal settings. The set of input images is "sparse" in the sense that only a small number of input images is used, for example two or three input images. In some embodiments, there are large variations in focal depth among the input images. Alternatively or additionally, the input images may have different depths of field, with different focal depths or with the same focal depth among the input images. (The term "focal depth," as used in the present description and in the claims, refers to the distance from the imaging device to the plane in the scene that is imaged most sharply onto the image sensor in the imaging device.) For example, compared to the input image with the shortest focal depth, another input image in the set may have a focal depth that is greater than the shortest focal depth, for example 30% greater, or possibly 50% greater or even twice as great.

Despite the sparsity of the input images, however, the output image produced by the neural network has an extended depth of field, which encompasses the entire range of focal depths of the input images. In other words, not only will objects that were sharply focused in one of the input images (though not in the other input images) appear in sharp focus in the output image, but so will objects in the scene at distances between the focal depths of the different input images. Thus, even objects that are out of focus in each of the input images will be sharply focused in the output image.

As noted above, the present embodiments are capable of using sequences of input images of a scene that are captured using a handheld imaging device, such as a smartphone. The imaging device operates, typically automatically, to capture the input images with different focal settings, so that the respective focal depths of first and second images in the sequence vary. For example, the focal depths may vary by at least 30%, depending on the optical properties of the imaging device. (The terms "first," "second," and "third" are used arbitrarily in the present description and in the claims to denote different input images and do not imply that the input images are acquired in this order or any other order.) The fields of view of the input images are typically not perfectly aligned and may be shifted transversely, for example by 1° or more from one image to another, or even by 5° or more.

In some embodiments, the handheld imaging device captures the input images sequentially, using a single camera with varying focal settings. Motion of the user's hand may give rise to the shift in FOV from one image to another.

Other embodiments take advantage of the existence of multiple cameras in a single smartphone or other handheld imaging device, for example a primary camera and a wide-angle camera, as are present in many smartphones now on the market. In these embodiments the images are captured using different cameras, and the FOV of one of the input images is wider than the FOV of another of the input images. For example, in one embodiment, the FOV of one of the input images is at least 10% wider than that of another, and possibly 20% wider or more. Additionally or alternatively, the input images may have different depths of field, with the same focal depth or different focal depths. Further additionally or alternatively, the focal depth of one of the cameras may be swept over multiple different values to capture multiple input images having different, respective focal depths. As yet another alternative, input images from three or more cameras may be combined to produce an output image with extended depth of field.

In the disclosed embodiments, a processor preprocesses the input images in the sequence so as to align the images. This alignment typically includes aligning the fields of view of the input images. In may also include warping one or more of the input images so as to register geometrical features among the input images and/or correcting photometric variations among the input images. The aligned images are then input to a neural network, which generates an output image having an extended depth of field encompassing the focal depths of the input images.

FIG. 1 is a schematic pictorial illustration showing capture of an electronic image with extended depth of field using a handheld imaging device, such as a smartphone 20, in accordance with an embodiment of the invention. In the pictured scenario, a user 22 holds smartphone 20, which captures input images of a scene 24 that include a person 26 of interest, along with an intermediate background 28 and a distant background 30.

Figures 2, 3A:
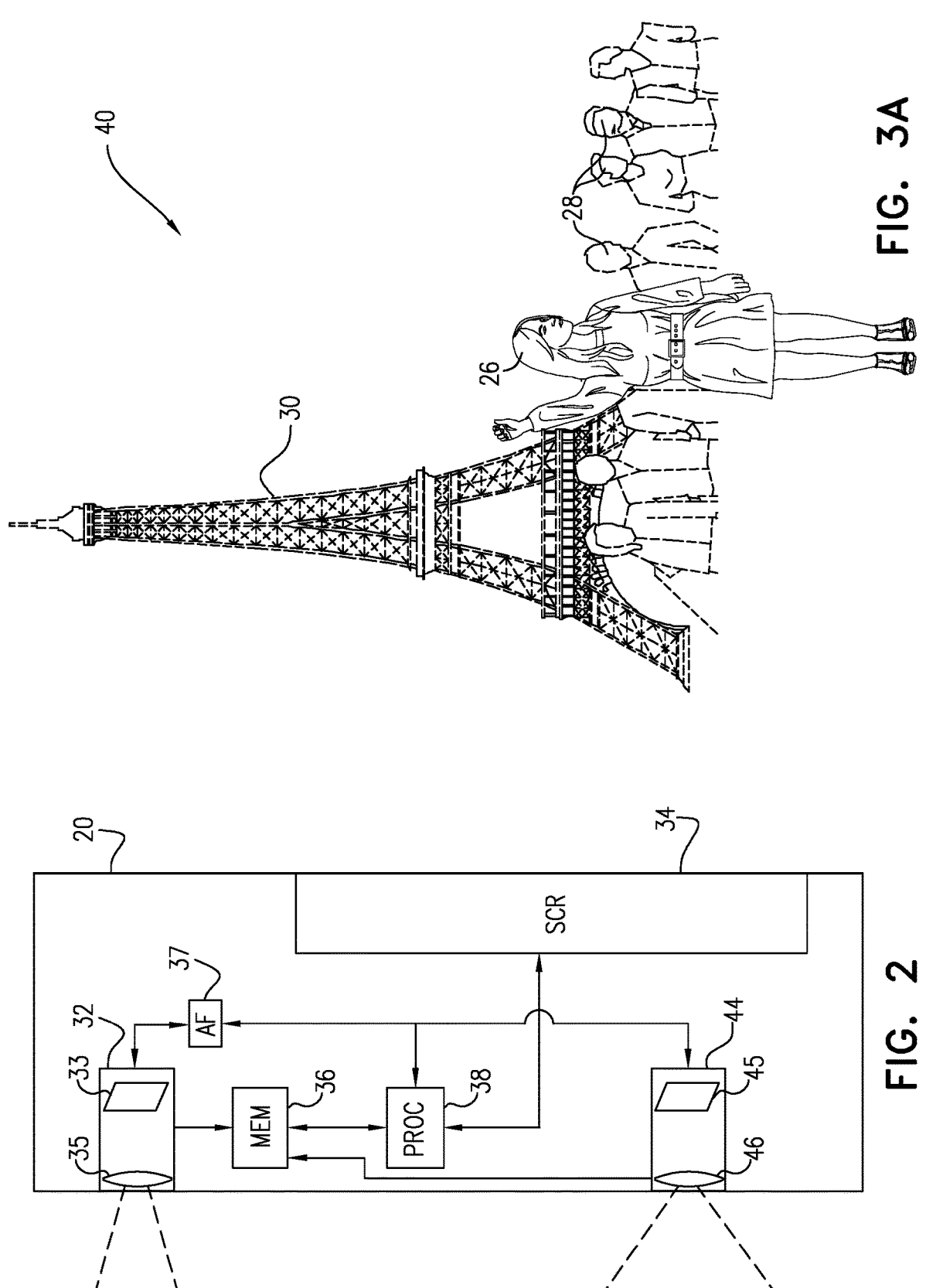
FIG. 2 is a block diagram that schematically shows details of a handheld imaging device, in accordance with an embodiment of the invention.
FIGS. 3A and 3B are schematic representations of input images captured by a handheld imaging device, in accordance with an embodiment of the invention.

FIG. 2 is a block diagram that schematically shows details of smartphone 20, in accordance with an embodiment of the invention. A main camera module 32 in the smartphone captures input images of scene 24. Main camera module 32 comprises an image sensor 33 and an objective lens 35, which focuses an image of the scene onto the image sensor. An autofocus mechanism 37 adjusts the focal setting of camera module 32, thus setting the depth of focus for each input image. In some embodiments, over a sequence of input images captured by camera module 32, autofocus mechanism 37 sweeps over a range of depths of focus, as illustrated in the figures that follow.

In the embodiment shown in FIG. 2, smartphone 20 also comprises a wide-angle camera module 44, comprising an image sensor 44 and an objective lens 46, which focuses a wide-angle image of the scene onto image sensor 45. The FOV of wide-angle camera module 44 is wider than that of main camera module 32, and may be even wider, and it is shifted transversely relative to the FOV of the main camera module. In some embodiments, autofocus mechanism 37 sets the two camera modules to different focal depths, for example focal depths differing by at least 50%. Alternatively, when camera modules 32 and 44 have different depths of field, autofocus mechanism 37 may set the two camera modules to the same focal depth (or to different focal depths). Both camera modules are triggered to capture respective images simultaneously at the respective focal settings.

The input images captured by camera modules 32 and/or 44 are stored in a memory 36. A processor 38 processes the input images to generate an output image with an extended depth of field. The functions of processor 38 in this regard typically include both preprocessing to align the input images and then processing the aligned images in a neural network. The output image is saved in memory 36 and can be presented on a display screen 34 of smartphone 20, as well as transmitted over a communication link.

Processor 38 typically comprises a general-purpose microprocessor, which is programmed in software to carry out the functions that are described herein. Additionally or alternatively, processor 38 may comprise special-purpose programmable components, such as a parallel processing array or a digital signal processor (DSP). The software run by processor 38 for the present purposes may be stored in tangible, non-transitory computer-readable media, such as optical, magnetic, or electronic memory media. Alternatively or additionally, at least some of the functions of processor 38 may be implemented in programmable or hard-wired digital logic. In addition, processor 38 typically controls autofocus mechanism 37 and carries out other functions that are beyond the scope of the present description.

Figure 3B:
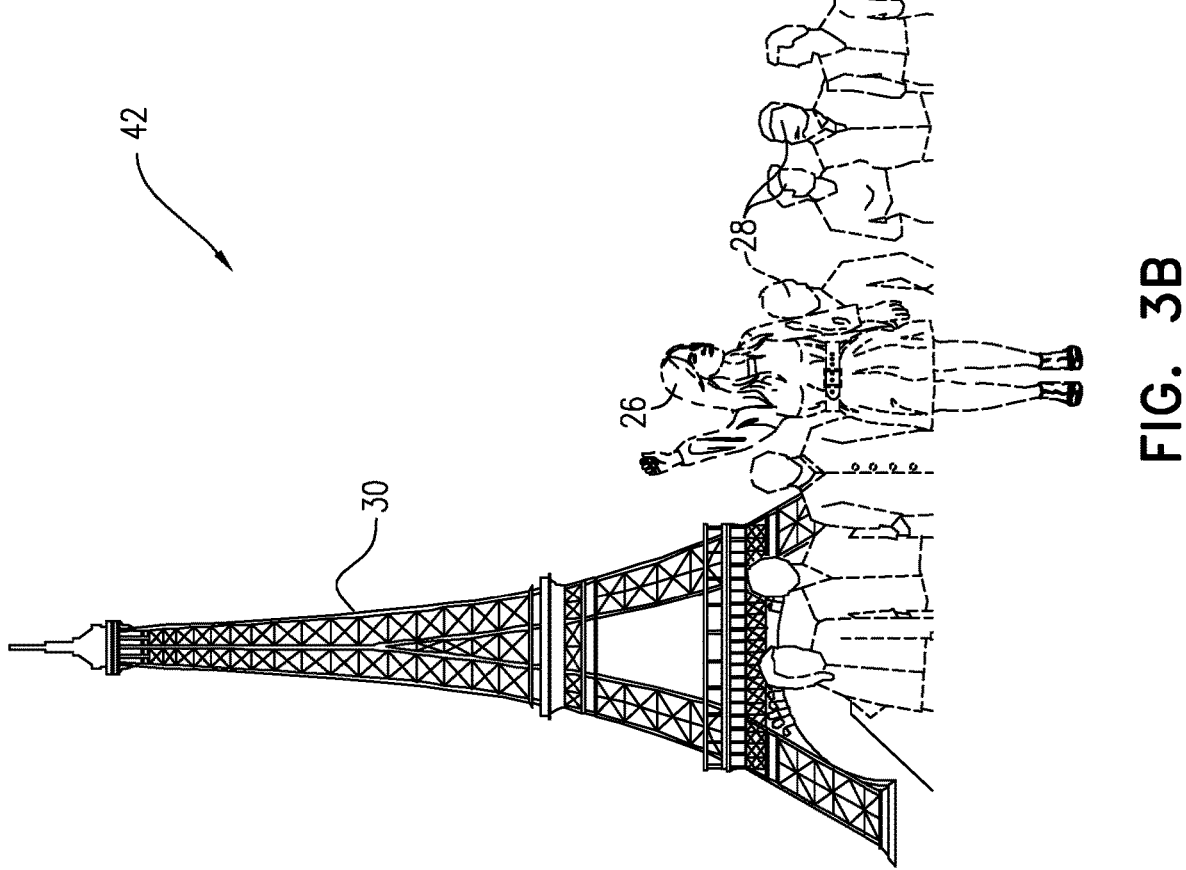

FIGS. 3A and 3B are schematic representations of input images 40 and 42 captured by smartphone 20, in accordance with an embodiment of the invention. The input images may be captured sequentially by a single camera, such as camera module 32, or simultaneously by two cameras, i.e., image 40 captured by camera module 32 and image 42 by camera module 44. In FIG. 3A, autofocus mechanism 37 sets camera module 32 to a short focal depth, at which person 26 is sharply focused, while intermediate background 28 and a distant background 30 are blurred. In FIG. 3B, autofocus mechanism 37 sets camera module 32 or camera module 44 to a long focal depth, for example infinite focal depth, at which distant background 30 is sharply focused, while person 26 and intermediate background 28 are blurred. In addition, the field of view (FOV) of image 42 in the present example is shifted relative to that of image 40 due to movement of smartphone 20 or to the inherent displacement of camera module 44 relative to camera module 32; and the magnification of image 42 may also be different from that of image 40 due to the change in focal setting and/or the larger FOV of camera module 44. Alternatively, as noted earlier, the present methods are also applicable, for example, when the fields of view of images 40 and 42 have the same central axis but different depths of focus.

Figure 4:
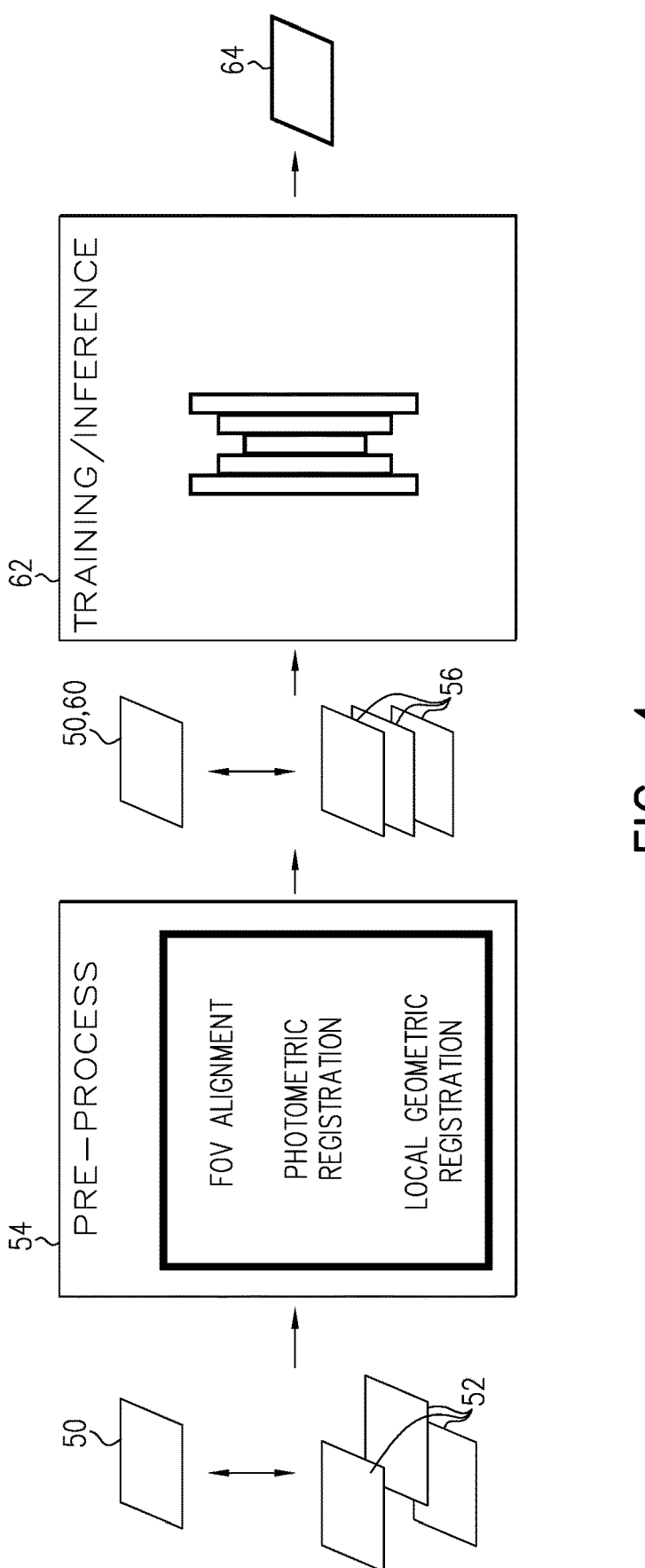
FIG. 4 is a flow chart that schematically illustrates a method for processing images, in accordance with an embodiment of the invention.

FIG. 4 is a flow chart that schematically illustrates a method for processing images, in accordance with an embodiment of the invention. This method will be described, for the sake of convenience and clarity, with reference to the components of smartphone 20, as described above. Alternatively, this method may be carried out using any other suitable sorts of imaging device and processor.

The method of FIG. 4 begins with capture of multiple input images 50, 52 by camera module 32. Image 50 is selected as the base image, with which the other input images will be aligned. For example, image 40 (FIG. 2A), in which the object of interest (person 26) is in focus, may be chosen as image 50, while image 42 (FIG. 2B) and possibly other input images are chosen as images 52. Images 50, 52 may be color images, such as RGB or YUV video images, or they may alternatively be monochrome images.

Processor 38 applies two successive processing stages to input images 50, 52:

A preprocessing stage 54, in which input images 52 are aligned with image 50, creating a set of aligned images 50, 56; and An inference stage 62, in which aligned images 50, 56 are processed in a neural network to generate an output image 64 having an extended depth of field, encompassing at least the full range of focal depths of input images 50, 52, meaning that the extended depth of field may even extend outside the range of focal depths of the input images.

Any suitable type of neural network may be used in inference stage 62, for example a network based on the well-known U-Net architecture or a Kernel Prediction Network. Prior to deployment on processor 38, the network is trained using a training set of images. In this training set, the ground truth image (or images) is an image of a test scene with an extended depth of field, in which all objects are in sharp focus over a large range of depths. The training images of the test scene may be derived from the ground-truth image. The training images, however, have different focal settings and narrow focal depths, meaning that objects at a certain depth are in sharp focus while objects at other depths are blurred. Typically, the training set includes multiple different ground truth images and corresponding sets of training images with different focal settings. Optionally, fields of view of the training images may be slightly offset from that of the ground truth image to account for the possibility of imperfect alignment in preprocessing stage 54.

The neural network is trained to combine the training images so as to generate an output image identical to the ground truth image. The training process attempts to minimize a given loss function, such as a multi-scale structural similarity index measure (MS-SSIM) loss function, using a suitable optimization technique, such as the Adam stochastic gradient descent algorithm. Typically, the machine learning network will include initial encoder layers, which encode the features of the image data, followed by processing layers to produce the output image. Once the training process has been completed, the network coefficients are loaded into memory 36 for use by processor 38. Alternatively, only the encoder layers may be executed by processor 38, which then stores and/or passes the encoded features to another processor (not shown) for decoding and offline generation of the output image. This latter approach can be useful in conserving power in smartphone 20, for example.

Returning now to preprocessing stage 54, the purpose of this stage is to register images 52 with base image 50 both geometrically and photometrically. The geometrical registration includes both a global registration step, in which the fields of view of the images are aligned, and a local registration step, in which the image features are aligned.

In the global registration (FOV alignment) step, processor 38 corrects input images 52 for lens distortions and changes in the position of the lens and camera module from one input image to another. Lens distortion is typically corrected by applying camera calibration factors. FOV alignment can be performed by image homography estimation. The coefficients derived from the homography estimation are applied in translating, rotating, and interpolating the pixel values in input images 52 to match base image 50.

In the local registration step, following FOV alignment, processor 38 densely aligns input images 52 with base image 50 to correct local distortions and deviations. For example, processor 38 may calculate an optical flow vector for each block of pixels in each image 52, relative to base image 50, and may then apply these vectors in warping images 52 so that local features are aligned with the corresponding features in base image 50. Alternatively, processor 38 may first rectify the input images according to epipolar constraints and then estimate the disparity for each block of pixels in each image 52, relative to base image 50. The processor may apply the resulting vectors in warping images 52 so that local features are aligned with the corresponding features in base image 50. When input images from different camera modules are combined, the image or images with the wider FOV (such as input images captured by camera module 44) may be cropped to match the narrower field of view of the base image.

In the photometric registration step, processor 38 corrects for any photometric variations that may have occurred in the serial capture of input images 50, 52. These variations may be the result, for example, of rapid changes in the scene or variations in the firmware parameters of the camera module, such as color and exposure settings. The firmware-related variations can be minimized or eliminated by fixing the camera module parameters during the course of capturing the sequence of input images. Alternatively or additionally, processor 38 may compute a histogram for each channel (RGB or YUV, for example) of each of the input images and then adjust input images 52 so that their histograms match those of base image 50. Alternately, any other suitable color and intensity matching algorithms that are known in the art may be used for this purpose.

Following preprocessing stage 54, the resulting aligned images 50 and 56 are input to the trained neural network in inference stage 62. The neural network generates output image 64 with extended depth of field. As noted above, this process may be divided into an online encoding step, carried out by processor 38, followed by an offline decoding step performed later, possibly by a different processor.

In an alternative embodiment, when two camera modules are used to capture the input images, input images from at least one of the camera images can be predicted from the input images captured by the other camera module. For this purpose, a prediction error is estimated between a frame captured by one camera module and a corresponding frame of the other camera module captured at the same time. For this purpose, for example, the disparity between the images is calculated (including the effects of parallax) to produce a displacement vector, along with a prediction error at every pixel position. The image stream output by one of the camera modules, which is selected to serve as the reference module, is captured and stored along with the prediction error for the other camera module and the displacement vector field. The predicted camera stream is then reconstructed offline using the prediction data and the displacement vectors and is combined with the reference camera stream to produce output images with extended depth of field, as described above. This technique may be extended, mutatis mutandis, to images captured by three or more camera modules.

Figure 5:
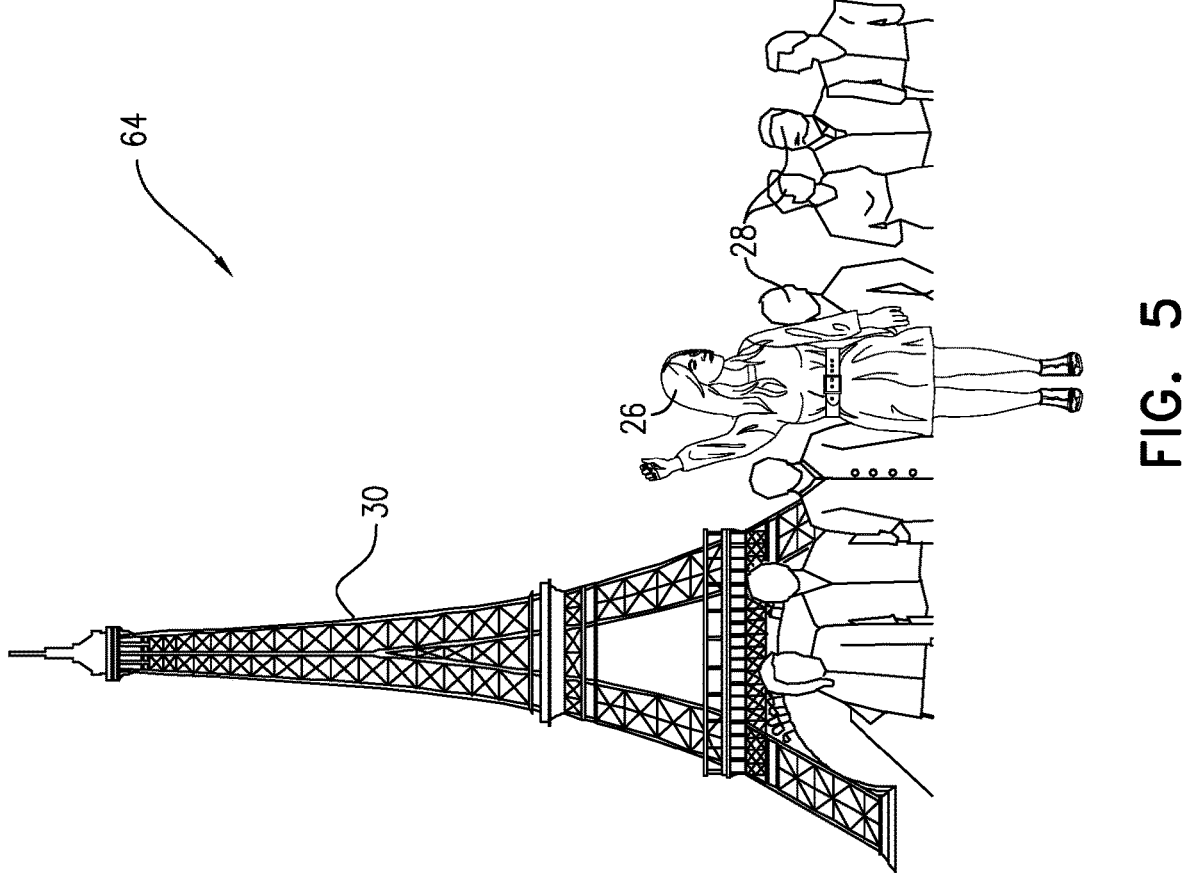
FIG. 5 is a schematic representation of an output image with enhanced depth of field, in accordance with an embodiment of the invention.

FIG. 5 is a schematic representation of output image 64, in accordance with an embodiment of the invention. Person 26 of interest, intermediate background 28, and distant background 30 are all sharply focused. The sharp focus of intermediate background 28 in output image 64 is achieved even though the intermediate background is out of focus in both of input images 40 and 42 (FIGS. 2A/B).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for image enhancement, comprising:

capturing multiple input images of a scene, including at least a first input image having a first field of view (FOV) captured with a first focal depth and a second input image having a second FOV captured with a second focal depth, which is greater than the first focal depth, wherein the second FOV is wider than the first FOV;

preprocessing the multiple input images so as to align the multiple input images; and processing the aligned images in a neural network, which generates an output image having an extended depth of field encompassing at least the first and second focal depths.

2. The method according to claim 1, wherein capturing the multiple input images comprises capturing at least the first and second input images sequentially using a handheld imaging device.

3. The method according to claim 1, wherein capturing the multiple input images comprises capturing at least the first input image using a first camera and at least the second input image using a second camera, different from the first camera.

4. The method according to claim 1, wherein the second FOV is at least 15% wider than the first FOV.

5. The method according to claim 3, wherein capturing at least the second input image comprises capturing multiple second input images having different, respective focal depths using the second camera.

6. The method according to claim 1, wherein the second FOV is shifted transversely relative to the first FOV.

7. The method according to claim 6, wherein the second FOV is shifted transversely by at least 1° relative to the first FOV.

8. The method according to claim 1, wherein the second focal depth is at least 30% greater than the first focal depth.

9. The method according to claim 1, wherein the first input image has a first depth of field, and the second input image has a second depth of field, different from the first depth of field.

10. The method according to claim 1, wherein the sequence of images comprises no more than three input images, which are processed to generate the output image.

11. The method according to claim 10, wherein the second focal depth is greater than the first focal depth, and wherein the sequence of images comprises a third input image having a third focal depth greater than the second focal depth, wherein the extended depth of field encompasses at least the first and third focal depths.

12. The method according to claim 1, wherein preprocessing the input images comprises aligning at least the first and second fields of view of the first and second input images.

13. The method according to claim 1, wherein preprocessing the input images comprises warping one or more of the input images so as to register geometrical features among the input images.

14. The method according to claim 1, wherein preprocessing the images comprises correcting photometric variations among the input images.

15. The method according to claim 1, and comprising training the neural network using a ground-truth image of a test scene having an extended depth of field and a set of training images of the test scene having different, respective focal settings.

16. The method according to claim 1, wherein processing the aligned images comprises generating the output image such that an object in the scene that is out of focus in each of the input images is sharply focused in the output image.

17. The method according to claim 1, wherein the neural network comprises one or more encoder layers, which encode features of the images, and decoding layers, which process the encoded features to generate the output image, and wherein processing the aligned images comprises implementing the encoder layers in a first processor to produce encoded features of the input images, and conveying the encoded features to a second processor, which implements the decoding layers to decode the encoded features and generate the output image with the extended depth of field.

18. The method according to claim 1, wherein preprocessing the input images further comprises estimating a displacement vector and a prediction error, which predict the second input image in terms of the first input image, and wherein processing the aligned images comprises reconstructing the second input image based on the first input image and the estimated displacement vector and prediction error, and processing the first image together with the reconstructed second image to generate the output image with the extended depth of field.

19. Imaging apparatus, comprising:

an imaging device configured to capture multiple input images of a scene, including at least a first input image having a first field of view (FOV) captured with a first focal depth and a second input image having a second FOV captured with a second focal depth, which is greater than the first focal depth, wherein the second FOV is wider than the first FOV; and a processor, which is configured to preprocess the multiple input images so as to align the multiple input images, and to process the aligned images in a neural network, which generates an output image having an extended depth of field encompassing at least the first and second focal depths.

20. The apparatus according to claim 19, wherein the imaging device comprises a handheld camera, which is configured to capture at least the first and second input images sequentially.

21. The apparatus according to claim 19, wherein the imaging device comprises a first camera, which is configured to capture at least the first input image, and a second camera, which is configured to capture at least the second input image.

22. A computer software product, comprising a non-transitory computer-readable medium in which program instructions are stored, which instructions, when read by a processor, cause the processor to receive multiple input images of a scene, including at least a first input image having a first field of view (FOV) captured with a first focal depth and a second input image having a second FOV captured with a second focal depth, which is greater than the first focal depth, wherein the second FOV is wider than the first FOV, to preprocess the multiple input images so as to align the multiple input images, and to process the aligned images in a neural network, which generates an output image having an extended depth of field encompassing at least the first and second focal settings.

\* \* \* \* \*